United States Patent
Doetsch et al.

(10) Patent No.: US 6,193,776 B1
(45) Date of Patent: Feb. 27, 2001

(54) ALKALINE EARTH METAL PEROXIDE PRODUCT

(75) Inventors: Werner Doetsch, Bad Hoenningen; Otto Caspar, Neuwied, both of (DE)

(73) Assignee: Solvay Interox GmbH, Hannover (DE)

(*) Notice: Subject to any disclaimer, the term of this patent is extended or adjusted under 35 U.S.C. 154(b) by 0 days.

(21) Appl. No.: 08/985,962

(22) Filed: Dec. 5, 1997

(30) Foreign Application Priority Data

Dec. 6, 1996 (DE) .............................. 196 50 686

(51) Int. Cl.[7] .............................. C05D 3/02; C05D 5/00; C01B 15/043
(52) U.S. Cl. .......................... 71/63; 423/583; 252/186.43; 252/186.29; 252/186.27
(58) Field of Search .............. 252/186.43, 186.29, 252/186.27; 423/582, 583; 71/63

(56) References Cited

U.S. PATENT DOCUMENTS

| | | | |
|---|---|---|---|
| 4,399,633 | * 8/1983 | Haughey et al. | 47/57.6 |
| 4,427,644 | * 1/1984 | Doetsch et al. | 423/582 |
| 5,264,018 | * 11/1993 | Koenigsberg et al. | 71/63 |
| 5,395,419 | * 3/1995 | Farone et al. | 71/63 |

FOREIGN PATENT DOCUMENTS 63-270612 * 11/1988 (JP) .............................. A01N/59/00

OTHER PUBLICATIONS

Lazell, E.W., Hydrated Lime, p 21–22, Dec. 1915.*
Lewis, R. J., Hawley's Condensed Chemical Dictionary, Calcium Hydroxide, p204, 1993.*

* cited by examiner

Primary Examiner—Steven P. Griffin
Assistant Examiner—Christina Ildebrando
(74) Attorney, Agent, or Firm—Evenson, McKeown, Edwards & Lenahan, P.L.L.C.

(57) ABSTRACT

A homogeneous calcium/magnesium peroxide, its manufacture and use are described. The new calcium/magnesium peroxide is suitable in particular as an additive used as source of oxygen and acid buffer, e.g. in the application, processing, treatment and/or disposal of various biomaterials.

14 Claims, No Drawings

ALKALINE EARTH METAL PEROXIDE PRODUCT

BACKGROUND OF THE INVENTION

The invention relates to an alkaline earth metal peroxide product, its manufacture and use.

Alkaline earth metal peroxides, in particular calcium peroxide, are well known in the art and are used for a variety of applications. A widely used alkaline earth metal peroxide is calcium peroxide which is used e.g. as a source of oxygen for aerobic microorganisms during the treatment and disposal of biological waste. Typical fields of use include, e.g., the prevention of the formation of odors, for example in biological composting bins and at biological bin collecting sites, the improvement of the decay properties of organic materials (biomaterials) during composting and the prevention of putrefaction, for example in compost heaps with a high proportion of cut grass. As a rule, calcium peroxide is not used as a source of oxygen alone, but together with other additives such as extenders, for example silicates or aluminosilicates, and mineral salts. During the treatment of biological waste—Similar to the treatment of effluents, there is generally a shortage of trace elements present during the treatment of biological waste, and, as a rule, also a lack of magnesium in the systems concerned. Consequently, in the prior art, magnesium in the form of inorganic salts, e.g. as sulphate, or in the form of magnesium silicates is added to biomaterials during treatment in order to promote or increase the effectiveness of the microorganisms involved in the treatment. However, in the prior art the individual components for the treatment of the biomaterials have been mixed into the biomaterial separately, as a result of which the individual components are frequently unable to interact in an optimum way due to unsatisfactory mixing. This is particularly true if individual components, such as magnesium, are added in small quantities and are consequently difficult to distribute evenly in the biomass, or can only be uniformly distributed by time-consuming mixing.

SUMMARY OF THE INVENTION

Consequently, the object of the invention was to make magnesium available in a form in which it can be easily mixed into a biomaterial so that it is capable of interacting in an optimum way with a calcium peroxide oxygen source used in treatment of the biomaterial.

This and other objects have been achieved in accordance with the present invention by providing a homogeneous calcium/magnesium peroxide having a magnesium content of 2 to 17% by weight, preferably 2 to 10% by weight. The calcium/magnesium peroxide according to the invention preferably has an active oxygen content of 10 to 18% by weight, particularly preferably 13 to 17% by weight, and also preferably has a calcium content of 30 to 53% by weight, particularly preferably 40 to 50% by weight.

In accordance with a further aspect of the invention, the objects have been achieved by providing a process for preparing a homogeneous calcium/magnesium peroxide having a magnesium content of 2 to 17% by weight, comprising the steps of reacting an aqueous solution or suspension of calcium hydroxide and at least one magnesium compound selected from magnesium oxide and magnesium hydroxide, with an aqueous 30 to 70% by weight hydrogen peroxide solution at a temperature below 60° C., and thereafter evaporating water and drying to obtain a solid calcium/magnesium peroxide product. The process is preferably carried out by reacting an aqueous suspension of calcium hydroxide and magnesium oxide hydroxide and/or hydroxide having a solids content of 350 to 450 g/liter with an aqueous 45 to 65% by weight hydrogen peroxide solution at a temperature in the range from about 30° C. to 40° C. with the addition of an effective peroxygen stabilizing amount of a stabilizer for inorganic peroxygen compounds.

In accordance with yet another aspect of the invention, the objects have been achieved by providing an improved method of composting biomass in which a homogenous calcium/magnesium peroxide having a magnesium content of 2 to 17% by weight is incorporated in the biomass, or a method of retarding putrefaction of or odor generation by biomaterial during processing, treatment or waste disposal, comprising incorporating in the biomaterial an effective putrefaction or odor inhibiting amount of a homogeneous calcium/magnesium peroxide having a magnesium content of 2 to 17% by weight.

DETAILED DESCRIPTION OF PREFERRED EMBODIMENTS

Accordingly, the invention relates to a homogeneous calcium/magnesium peroxide which, apart from is content of calcium, active oxygen (Avox) and optionally small amounts of additives and/or stabilizers conventionally used in the manufacture of inorganic peroxygen compounds, is characterized in particular by a magnesium content of 2 to 17% by weight. Preferably, the magnesium content of the calcium/magnesium peroxide product according to the invention is 2 to 10% by weight. As a rule, the active oxygen (Avox) content of the calcium/magnesium peroxide product according to the invention amounts to 10 to 18% by weight, active oxygen contents of 13 to 17% by weight being preferred. As a rule, the calcium content of the calcium/magnesium peroxide product according to the invention is 30 to 53% by weight; calcium contents of 40 to 50% by weight are preferred. The calcium/magnesium peroxide product according to the invention is an alkaline earth metal peroxide in which calcium peroxide and magnesium peroxide are present homogeneously distributed in each other on a molecular level. Depending on the active oxygen (Avox) content of this product, which can be controlled by the corresponding quantity of hydrogen peroxide used in the manufacture of the product, the product may still contain fractions of unreacted calcium and/or magnesium oxide and/or hydroxide, these oxidic and/or hydroxidic fractions also being homogeneously distributed at the molecular level in the calcium/magnesium peroxide product.

Moreover, the calcium/magnesium peroxide according to the invention may contain small quantities of the usual additives and/or stabilizers such as those usually used in the manufacture of inorganic peroxygen compounds. Such additives include, for example, water glass or the usual active oxygen stabilizers such as commercial phosphonic acids and their salts.

The calcium/magnesium peroxide according to the invention has advantageous stability properties. The loss of dry stability (measured under standard conditions: 1 g/2 hours/ 105° C.), for example, is less than 10%; preferably the loss of dry stability is less than 5%, in particular less than 3%.

The calcium/magnesium peroxide according to the invention is characterized by a series of advantages. On the one hand, magnesium is made available in the peroxide product in a homogeneous distribution which is advantageous for the application concerned. In this way, the peroxide product provided according to the invention can simultaneously fulfil the functions of providing a source of oxygen and also providing an advantageous source of magnesium. Therefore, when the calcium/magnesium peroxide according to the invention is used for a wide variety of applications described below, no separate addition of magnesium salts (e.g. magnesium sulfate or magnesium silicate) is necessary, and complex mixing steps for the incorporation of such separate magnesium compounds are thus superfluous.

The magnesium can be incorporated into the calcium/magnesium peroxide according to the invention in a simple manner by merely also adding a suitable source of magnesium as a further starting material in conventional processes for the production of calcium peroxide. Suitable sources of magnesium include, in particular, magnesium oxide and/or magnesium hydroxide; optionally, magnesium carbonate can also be used or employed simultaneously.

The invention also relates to a process for the manufacture of the homogeneous calcium/magnesium peroxide product according to the invention, which is characterized in that an aqueous solution or aqueous suspension of calcium hydroxide and in particular of magnesium oxide and/or magnesium hydroxide is reacted with a 30 to 70% by weight aqueous hydrogen peroxide solution at temperatures below 60° C. and that, after the reaction has taken place, the resulting calcium/magnesium peroxide product is obtained as a solid by evaporating the water and drying the reaction product. Preferably, the reaction is carried out at temperatures in the region of approximately 30 to 40° C., in particular at approximately 30° C., the usual processes for cooling, e.g. water cooling, being sufficient to adjust the temperature. If desired, small quantities of additives and/or stabilizers commonly used in the manufacture of inorganic peroxygen compounds can be added before, simultaneously with or after the reaction with the aqueous hydrogen peroxide solution, such as those mentioned as examples above. For example, it may be appropriate to add water glass as additive or conventional active oxygen stabilizers such as Turpinal™ or Dequest™ as stabilizers during the manufacture of the calcium/magnesium peroxide according to the invention. Maintaining specific process parameters is not a particular problem for a person skilled in the art, since he is able to obtain relevant guidance from known processes for manufacturing calcium peroxide. The process for the manufacture of the calcium/magnesium peroxide mixed product according to the invention can be carried out both batchwise and in a continuous method of operation. In a preferred process variant, an aqueous suspension of calcium hydroxide with an addition of magnesium carbonate, magnesium oxide and/or magnesium hydroxide is reacted with the aqueous hydrogen peroxide solution. Preferably, suspensions with solids contents of 350 to 450 g/liter are used. As aqueous hydrogen peroxide solution, solutions with a hydrogen peroxide content of 45 to 65% by weight are preferably used. On completion of the reaction, the resulting calcium/magnesium peroxide product can be obtained as a solid in the usual way by evaporating the water and drying the reaction product. Preferably, the evaporation of the water and drying of the reaction product takes place in a short retention time dryer, in particular in a spray dryer or a spin flash dryer, for example.

The resulting solid homogeneous calcium/magnesium peroxide according to the invention can subsequently be compounded as desired. The calcium/magnesium peroxide produced can, for example, be adjusted to the desired grain size by granulation or formulated with further components commonly used in the field of application concerned. The calcium/magnesium peroxide according to the invention can also be made available for use directly in bags or, if necessary, in sachets.

The calcium/magnesium peroxide product according to the invention provides a source of oxygen and magnesium which can be used in various way in the application, processing, treatment and/or disposal of biomaterials and is additionally capable of buffering undesirable acids to a major extent. Accordingly, the invention also relates to the use of the homogeneous calcium/magnesium peroxide of the invention, as described above, as an additive in the application, processing, treatment and/or disposal of media containing biomaterials. Suitable biomaterial-containing media include, for example, kitchen waste and e.g. those mixtures, slurries and moist or dry solids mixtures which contain decomposable organic materials and usually arise in the fields of application mentioned above. Advantageously, the calcium/magnesium peroxide according to the invention can be used in particular for the treatment of biomaterials during composting and/or the disposal of various types of biological waste. The application and/or the use of the calcium/magnesium peroxide product according to the invention consequently ranges from its use in biomass, in biomass collection bins and sites, in composting, and in the processing and/or disposal of cut grass, to the processing of faeces, such as cow dung or pig manure, into fertilizers.

The following examples illustrate the invention in further detail without limiting its scope.

EXAMPLE 1

Approximately 1/20th of the total quantity of a 60% by weight hydrogen peroxide solution required in the reaction preparation was introduced into a reaction vessel equipped with a cooling device. Subsequently, a mixture (in the form of a suspension) of calcium hydroxide and magnesium oxide and/or magnesium hydroxide was simultaneously reacted with further hydrogen peroxide. The reactants were used in the following quantities:

12.1 kg calcium hydroxide
1.2 kg magnesium hydroxide
8.7 kg aqueous hydrogen peroxide (60% by weight), in addition to the approximately 0.5 kg hydrogen peroxide (60% by weight) originally introduced.

The quantities of hydrogen peroxide used were thus approximately equimolar to the calcium and magnesium reactants used. In addition, a quantity of 140 ml sodium water glass solution was added to complete the reaction preparation. The reaction temperature was maintained at approximately 40° C. throughout the entire reaction. The resulting slurry with a solids content of 300 g/liter was then dried in a spray dryer under the following conditions:

| | |
|---|---|
| $T_{inlet}$ | 380° C. |
| $T_{outlet}$ | 120° C. |
| Circumferential speed of the spray disc: | 154 m/s |
| Product temperature approximately 50° C. | |
| A calcium/magnesium peroxide product in powder form with the following composition was obtained: | |
| Calcium content | 46.8% by weight |
| Magnesium content | 4.2% by weight |
| Avox content | 15.9% by weight |
| and having the following properties: | |
| Loss of wet stability | 13.6% |
| Loss of dry stability | 2.7% |

EXAMPLE 2

Following the procedure of Example 1, the following quantities of starting products were reacted:

10.8 kg calcium hydroxide
0.55 kg magnesium hydroxide
1.51 kg magnesium oxide
10.7 kg aqueous hydrogen peroxide (60% by weight); in addition to the approximately 0.5% kg hydrogen peroxide (60% by weight) initially introduced
225 ml water glass A calcium/magnesium peroxide product was obtained with the following composition:

| | |
|---|---|
| Calcium content | 43.1% by weight |
| Magnesium content | 8.5% by weight |
| Avox content | 15.4% by weight |
| and having the following properties: | |
| Loss of wet stability | 12.5% |
| Loss dry stability | 3.6% |

EXAMPLE 3

Following the procedure of Example 1, the following quantities of starting products were reacted:

12.9 kg calcium hydroxide
0.7 kg magnesium hydroxide
9.6 kg aqueous hydrogen peroxide (60% by weight); in addition to the approximately 0.5% kg hydrogen peroxide (60% by weight) initially introduced
225 ml water glass A calcium/magnesium peroxide product was obtained with the following composition:

| | |
|---|---|
| Calcium content | 49.7% by weight |
| Magnesium aontent | 2.3% by weight |
| Avox content | 16.5% by weight |
| and having the following properties: | |
| Loss of wet stability | 12.2% |
| Loss dry stability | 2.1% |

| Legends | |
|---|---|
| Avox (= AVOX) = | Active oxygen (content) |
| Turpinal = | Aqueous 60 wt.-% solution of 1-hydroxyethane-1,1-diphosphonic acid (HEDP), peroxide stabilizing agent |
| h = | hour |
| Min. (= min.) = | minute |

Wet Stability: (Loss of Wet Stability)

The stability of a sample of peroxide in an aqueous medium is determined at elevated temperature by way of the loss of active oxygen. For this purpose, 1.56 ml water are added to a weighed quantity of 1,000 g of the peroxide sample with a known Avox content and subsequently placed in a closed vessel into a temperature controlled chamber for 20 minutes at 90° C. Subsequently, the sample is dissolved in approximately 100 ml mixed acid (composition: 1 liter HCl, 37% by weight/1 liter $H_3PO_4$, 85% by weight/6 liters demineralized $H_2O$) and titrated with potassium permanganate solution until a permanent, weak pink coloration is obtained. The loss of stability in percent is obtained as the redetermined active oxygen content, based on the original active oxygen content.

Dry Stability: (Loss of Dry Stability)

The stability of a dry peroxide sample is determined at elevated temperature through the loss of active oxygen. For this purpose, a weighed quantity of 1,000 g of the peroxide sample with a known Avox content is placed in a test tube into a temperature controlled chamber for 2 hours at 105° C. Subsequently, the sample is dissolved in approximately 100 ml mixed acid (composition: 1 liter HCl, 37% by weight/1 liter $H_3PO_4$, 85% by weight/6 liters demineralized $H_2O$) and titrated with potassium permanganate solution until a permanent, weak pink coloration is obtained. The loss of stability in percent is obtained as the redetermined active oxygen content, based on the original active oxygen content.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Homogeneous calcium/magnesium peroxide consisting essentially of:
   calcium peroxide and magnesium peroxide homogeneously distributed in each other on a molecular level, and
   an effective peroxygen stabilizing amount of a stabilizer for inorganic peroxygen compounds,
   said homogeneous calcium/magnesium peroxide having a magnesium content of 4.2 to 17% by weight, a calcium content of 30 to 53% by weight, and an active oxygen content of 13 to 18% by weight, and exhibiting a loss of dry stability measured under conditions of 1 gram/2 hours at 105° C. of less than 5%.

2. Calcium/magnesium peroxide according to claim 1, having a magnesium content of 4.2 to 10% by weight.

3. Calcium/magnesium peroxide according to claim 1, having a calcium content of 40 to 50% by weight.

4. A process for preparing a homogeneous calcium/magnesium peroxide consisting essentially of calcium peroxide and magnesium peroxide homogeneously distributed in each other on a molecular level, said homogeneous calcium/magnesium peroxide having a magnesium content of 4.2 to 17% by weight, a calcium content of 30 to 53% by weight and an active oxygen content of 13 to 18% by weight, and exhibiting a loss of dry stability measured under conditions of 1 gram/2 hours at 105° C. of less than 5%, said process consisting essentially of the steps of:
   reacting an aqueous solution or suspension of calcium hydroxide and at least one magnesium compound selected from the group consisting of magnesium oxide and magnesium hydroxide, with an aqueous 30 to 70% by weight hydrogen peroxide solution at a temperature below 60° C., and
   thereafter evaporating water and drying to obtain said calcium/magnesium peroxide as a solid product.

5. A process according to claim 4, wherein said reacting step is carried out at a temperature in the range from about 30° C. to 40° C.

6. A process according to claim 4, further comprising the step of adding an effective peroxygen stabilizing amount of a stabilizer for inorganic peroxygen compounds.

7. A process according to claim 4, wherein said aqueous hydrogen peroxide solution is an aqueous 45 to 65% by weight hydrogen peroxide solution.

8. A process according to claim 4, wherein an aqueous suspension of calcium hydroxide and of at least one magnesium compound selected from the group consisting of magnesium oxide and magnesium hydroxide, is reacted with said aqueous hydrogen peroxide solution.

9. A process according to claim 8, wherein said aqueous suspension has a solids content of 350 to 450 g/liter.

10. A process according to claim 4, wherein the evaporation of water and drying of reaction product are carried out in a short retention time dryer.

11. Homogeneous calcium/magnesium peroxide consisting essentially of:
   calcium peroxide and magnesium peroxide homogeneously distributed in each other on a molecular level, and
   an effective peroxygen stabilizing amount of a stabilizer for inorganic peroxygen compounds,
   said homogeneous calcium/magnesium peroxide having a magnesium content of 4.2 to 17% by weight, a calcium content of 30 to 53% by weight, and an active oxygen content of 13 to 18% by weight, and exhibiting a loss of dry stability measured under conditions of 1 gram/2 hours at 105° C. of less than 5%, wherein said homogeneous calcium/magnesium peroxide is obtained by a process comprising the steps of:
   reacting an aqueous solution or suspension of calcium hydroxide and at least one magnesium compound selected from the group consisting of magnesium oxide and magnesium hydroxide, with an aqueous 30 to 70% by weight hydrogen peroxide solution at a temperature in a range from about 30 to 40° C., in the presence of a stabilizer for inorganic peroxygen compounds, wherein said aqueous solution or suspension has a solid content of 350 to 450 g/liter, and
   thereafter evaporating water and drying in a short retention time dryer to obtain said calcium/magnesium peroxide as a solid product.

12. Homogeneous calcium/magnesium peroxide according to claim 11, having a magnesium content of 2 to 10% by weight.

13. Homogeneous calcium/magnesium peroxide according to claim 11, having a calcium content of 40 to 50% by weight.

14. Homogeneous calcium/magnesium peroxide according to claim 11, wherein said hydrogen peroxide solution is an aqueous 45 to 65% by weight hydrogen peroxide solution.

* * * * *